May 9, 1944. L. W. BEAVEN Re. 22,473

INTERNAL COMBUSTION ROTARY ENGINE

Original Filed June 17, 1941 2 Sheets-Sheet 1

INVENTOR.
LESLIE W. BEAVEN

BY

ATTORNEY.

May 9, 1944. L. W. BEAVEN Re. 22,473

INTERNAL COMBUSTION ROTARY ENGINE

Original Filed June 17, 1941 2 Sheets-Sheet 2

INVENTOR.
LESLIE W. BEAVEN.

BY

ATTORNEY.

Reissued May 9, 1944

Re. 22,473

UNITED STATES PATENT OFFICE 22,473

INTERNAL COMBUSTION ROTARY ENGINE

Leslie W. Beaven, Chicago, Ill.

Original No. 2,300,094, dated October 27, 1942, Serial No. 430,401, February 11, 1942, which is a division of Serial No. 398,428, June 17 1941. Application for reissue August 7, 1943, Serial No. 497,795

32 Claims. (Cl. 123—44)

This application is a division of my original application for a "Rotary engine for heavy fuel oils," which was filed June 17, 1941, Serial No. 398,428, and is now pending in the United States Patent Office.

The present invention relates to improvements in internal combustion rotary engines, more especially those of the four-cycle rotary radial cylinder type which is disclosed in my aforesaid copending application, and these improvements concern the centrifugal forcing of cooling air currents about the cylinders which are rapidly revolving within an external blower-like shell or housing, whereby the moving cylinders will perform the function of blower or impeller vanes to create the air currents. The control of the temperature of the cylinders is accomplished through the medium of suitable thermostatic devices co-acting with the other portions of the structure, so that the quantity of air is automatically regulated to the amount required to maintain a predetermined temperature of the cylinders at a minimum of power loss. The exhaust gases which are scavenged from the cylinders are discharged into said external shell or housing through an annular exhaust manifold that is common to the cylinders and their exhaust ports, and said gases, becoming mixed with the moving air currents in the shell, are thereby cooled and contracted to such an extent that the explosions are more or less muffled.

Another feature of my present improvements resides in the fact that the entire engine, especially the cylinders, is shielded and protected from the atmospheric elements. The temperature control of the engine and the exhausting of the burned gases from the cylinders take place in said exterior shell or jacket in which the engine is mounted and rotates, and these functions are simultaneous and interdependent more or less upon each other, so that one function is co-ordinated with and assisted by the other. I have provided thermostatic devices within the shield or jacket which effectively and dependably control the flow of air and the temperature therein. This arrangement provides advantages which are not found in other air-cooled engines, in that it will produce effective cooling in a vehicle or an airplane at rest with the engine running, and it will provide such an abundance of cooling when required as to permit much higher engine speed and horsepower with the same piston displacement.

One of the aims of my improvements is to provide an engine of a novel character, and which is adapted to perform its required functions in an effective manner.

Another object or aim is to provide an apparatus of the kind described, which is made of sturdy and dependable parts that are capable of withstanding heavy duty. The improvements disclosed herein are of compact arrangement; they are effective in operation; and the apparatus is economical to produce, so that it may be manufactured and sold at a competitive retail price.

The aforementioned and other objects, aims and advantages of my improvement will be obvious to persons who are skilled in the art, after the construction and operation of this apparatus are understood from the following description. It is preferred to practice this invention in substantially the manner hereinafter fully described and as more particularly enumerated in the appended claims, and for a better understanding of my improvements, reference is now made to the accompanying drawings that form a part of this specification.

Figure 1:
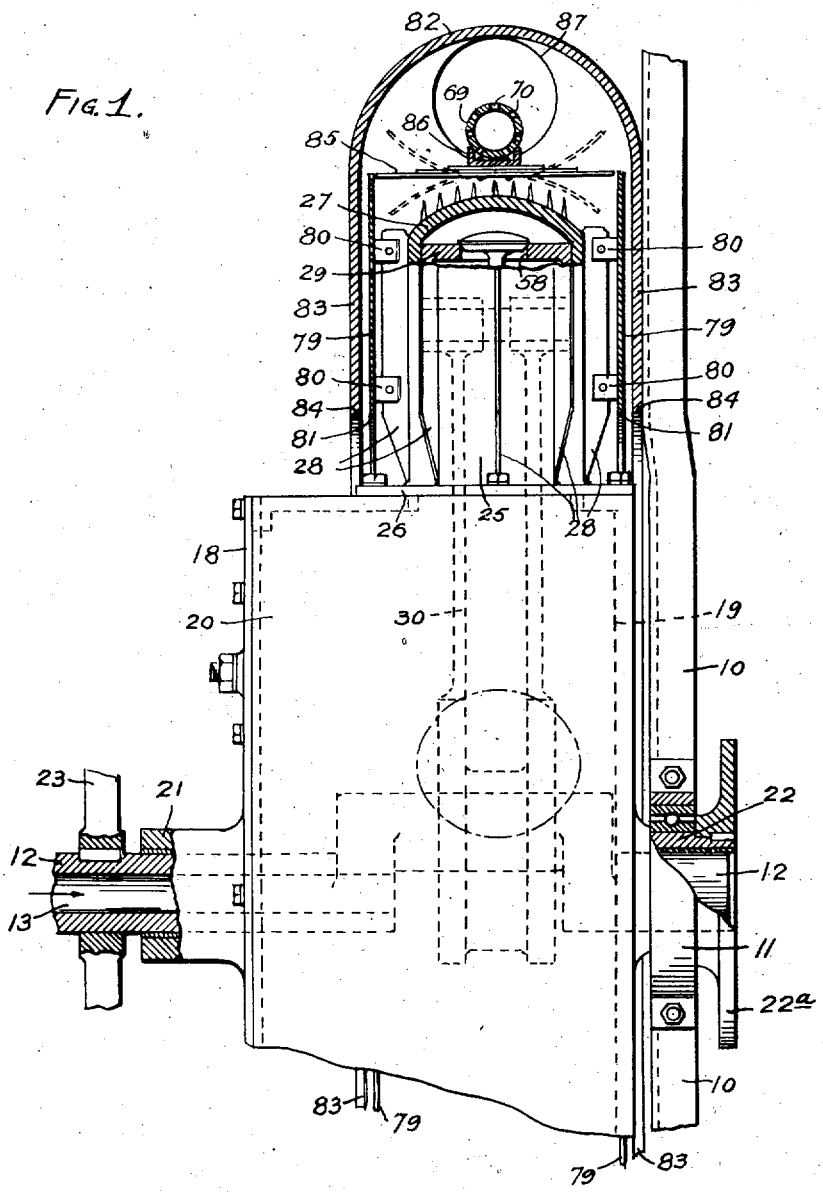
Figure 1 shows a fragmental portion of the rotary engine casing and one of the cylinders in vertical section, with the engine shield or housing and the exhaust manifold in transverse section. Adjacent cylinders are omitted in this view in the interest of clearness.
Figure 2:
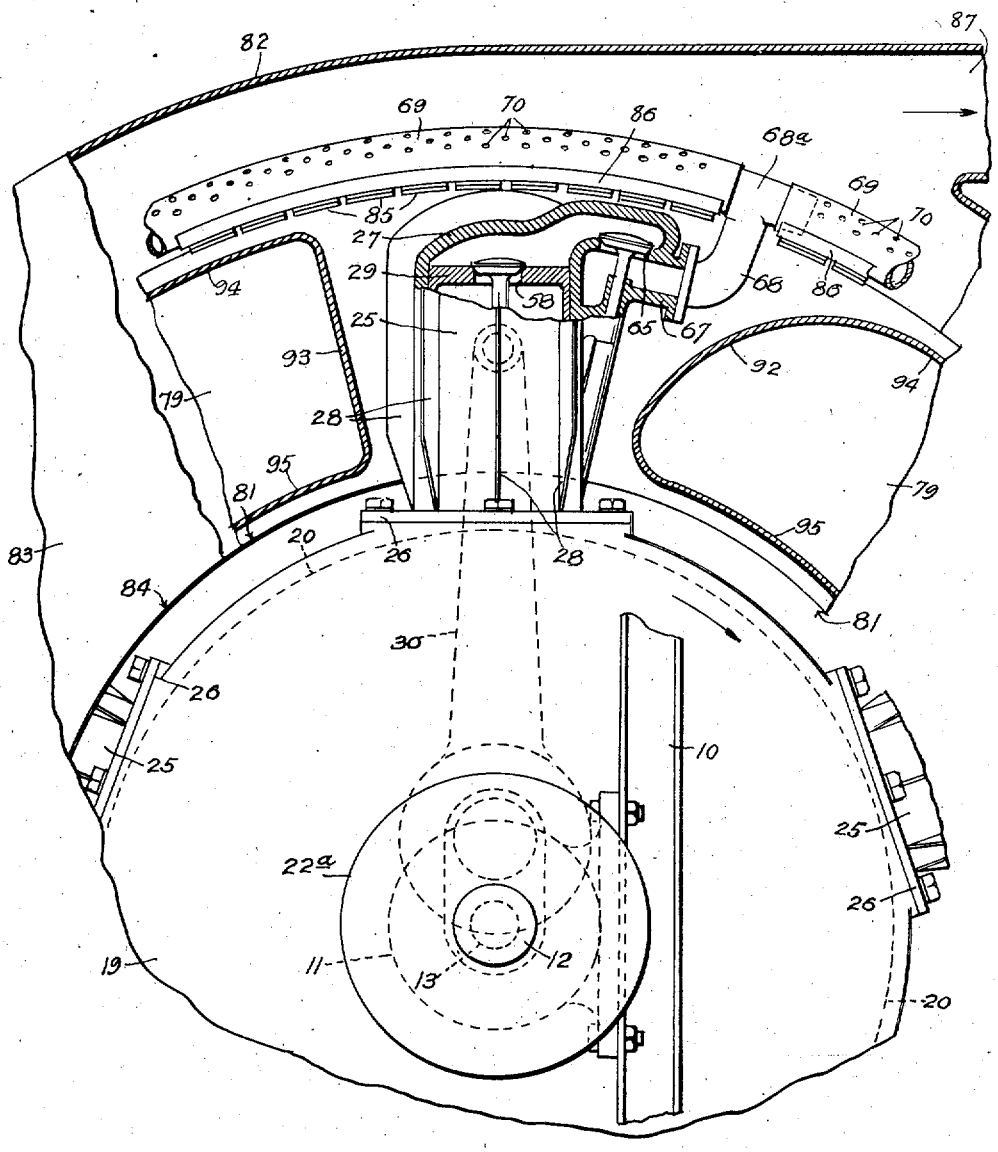
Figure 2 is a vertical side view of the structure shown in Figure 1, with the engine housing or shield and one of the cylinders partly broken away and in section.

The drawings are to be understood as being more or less schematic for the purpose of illustrating a typical or preferred embodiment of my improvement and its various parts, and in said drawings, like reference characters are employed to identify the same parts wherever such parts appear in the different views.

The improvements and the engine are capable of use in a motor vehicle, or other structure that is to be moved, but it is particularly adaptable for an airplane or automobile, because it has features of novelty which lend themselves to such special uses.

The drawings show a portion of a suitable supporting structure or framework 10, in the central portion of which there is a bearing 11, and there is a shaft 12 having a bore 13 through which an emulsion of air and heavy fuel oil is fed, said shaft being provided with a crank intermediate its ends. The engine casing is mounted for rotary movement upon spaced portions of the shaft on the sides of the crank, so that the latter is enclosed within said casing. This casing preferably comprises two side plates 18 and 19 which are spaced apart the desired distance and have their outer marginal edges secured to an annular closure member 20 that is of substantially cylindrical shape to be disposed concentric to the shaft, while the central portions of said side plates are provided with hollow hubs 21 and 22, respectively, that surround and are adapted to rotate on said shaft. One portion of the bearing 11 is secured to hub 22, and the other portion of said bearing is secured to the supporting frame 10 that may be mounted on the chassis or other support. A second support 23 embraces the opposite end portion of the shaft, so that by reason of this arrangement the shaft and crank are maintained stationary and the engine casing is adapted to rotate thereon. If desired, a power disc 22a is anchored to hub 22 to be connected with a mechanism to be driven by the engine.

A plurality of openings are made in the cylindrical casing member 20, and these openings have the engine cylinders 25 mounted in them in a manner so that the axes of said cylinders are disposed radially to the axis of the main shaft at a uniform angle to each other and in one plane which is at a right angle to said shaft. Annular base flanges 26 are formed near the inner ends of the cylinders and are adapted to be seated upon the outer face of the cylindrical member 20 to which said flanges are secured by bolts. Somewhat dome-shaped heads 27 close the outer ends of said cylinders, and lateral fins 28 are formed on the outer face of the cylinders to act as cooling elements during operation of the engine, at which time casing and cylinders are spinning or rotating on the shaft.

Each of the radial cylinders is provided with a hollow or cupped piston 29 that is adapted to reciprocate therein through the medium of a pitman-rod 30 that is pivotally connected to it and extends inwardly toward the crank portion of the shaft and is operatively connected thereto. Since the fuel is discharged into the engine casing and cylinders through the hollow shaft 12, the pistons are provided with valve-controlled inlet or fuel feed ports 58 which discharge the fuel into the combustion chambers of the cylinders. The cylinders are scavenged by means of valve-controlled exhaust ports 65 which discharge the products of combustion into an exhaust coupling 68 of angular or arcuate form. The intake and exhaust valves are properly timed and actuated by means of suitable mechanical instrumentalities, such for example as those set forth in my aforesaid copending parent application, to which specific reference is hereby made for the details of these devices.

The stems of the exhaust valves are mounted in the bores of hollow exhaust embossments 67 on the leading sides of the cylinders, and connected to said embossments are the exhaust couplings 68 that discharge into a suitable exhaust manifold 69. This manifold is preferably a continuous series of arcuate pipes that are provided with discharge openings 70. The disposition of the pipes is an end-to-end arrangement that are slip-jointed to provide a continuous ring that extends entirely around the engine and is suitably supported, being preferably anchored to the cooling fins of the cylinder heads, so that the manifold will rotate with the engine. The exhaust coupling has a cross-member 68a which at one end is secured to the end of the adjacent manifold section, while the other end of said cross-member is slidably inserted into the adjacent end of the next succeeding section of the manifold. When the exhaust valve is opened, the centrifugal force which is created by the rapidly revolving cylinders will relieve the piston of back-pressure and will assist in completely discharging the burned gases.

Novel means are provided for cooling the structure when the engine casing and cylinders are in rotation. To this end a suitable housing is employed which preferably embodies two plates or side members 79 disposed opposite to each other, with one on each side of the row of cylinders and spaced outwardly from the fins thereon and anchored to said fins by means of suitable brackets 80. These plates have openings 81 that permit the entrance of air into the housing structure in the manner of the suction opening of a blower. The outer margins of said plates terminate at about the outer edges of the fins on the domes of the cylinders for a purpose hereinafter fully described.

A stationary outer jacket or shield, having a semi-circular outer portion 82 and side walls 83, embraces or envelops the housing walls 79 and also the exhaust manifold pipe 69. This jacket or shield is of annular shape and has openings 84 for ingress of air to the inner space that is housed by the walls 79, and there is a tangential opening and stub 87 for exhausting the coolant air and the exhaust gases which have become commingled therewith inside said jacket or shield. The parts 82 and 83 of the shield or jacket are stationary by reason of anchorage thereof to the stationary frame members 10 or other stationary structure adjacent the engine, in order to permit the engine and engine casing to rotate within the same. Thus the cylinders and their fins are adapted to perform the functions of the impeller blades of a blower.

The passage of air from the inner housing, which is close to the cylinders, is controlled by providing a plurality of thermostatically influenced elements, preferably bi-metal plates or louvers 85, that are preferably spaced apart and are constructed so that they will alternately become bowed outwardly and inwardly in the manner suggested in dotted lines in Figure 1. The louvers 85 are arranged in an annular series disposed transversely across the periphery of the housing plates 79, and they are anchored intermediate their ends to channel-shaped segments 86 that are secured to the manifold pipe segments 69, the flanges of said channels being disposed outwardly and affording a suitable seat in which the exhaust manifold is mounted and secured. The opening and closing, or relative positioning of the louvers will thus thermostatically control the flow of air about the cylinders, and the elements themselves will be controlled by the air acting directly thereupon. These louvers extend across or span the annular space or opening between the outer margins of the side plates 79 to form closures for the housing formed thereby, but they do not touch said plates, thus permitting the free flexing of the louvers. The louvers preferably comprise a plurality of flat leaves of uniformly graduated lengths, in order to give the necessary stability without curtailing their warping or bowing function. The leaves are preferably welded laminations of nickel-steel and brass; the latter, having the greater co-efficient of expansion, will form the convex face of the louver when bowed from heat. The louvers are assembled alike as to their respective long and short leaves, but alternate louvers are opposed to each other as to their bending or bowing action under heat, one having the brass side outward and the next with its nickel-steel side outward. Since the warping movement is in an inverse ratio to the square of the thickness of the bi-metal, the suitable variations of the air passage are ascertained by the predetermined gauge of the bi-metal.

Baffling means of novel construction are interposed between adjacent cylinders and extend between the housing plates 79 for the purpose of directing the air into intimate relation to the surfaces of the cylinders and their fins. These baffles may comprise hollow box-like structures that are disposed with their axes transverse to the annular housing plates 79, and have their end edges secured to the inner faces of said plates in any suitable manner. As shown, one wall 92 of each baffle is curved to substantially conform generally with the contour of the proximate leading portion of the adjacent cylinder, and another or opposite wall 93 is straight and is alongside the adjacent portion of the advanced cylinder and is in a somewhat radial plane. Parallel annular walls 94 and 95 connect the shaped walls 92 and 93, and are disposed parallel with and adjacent the respective inner and outer margins of the plates 79, thus forming a box-like or enclosed structure between these plates and extending transversely between the cylinders. This structure reduces the spaces between the cylinders and compels the air, after entering the housing and shield, to pass outwardly or radially in more intimate relation to the surfaces of the cylinders.

It will be observed that the exhaust embossments 67 and the exhaust couplings 69 are positioned on the "leading" sides of the cylinders, thereby providing for the quicker and better cooling of these parts of the engine during operation thereof. This, however, is an optional arrangement. The centrifugal force created by the rapid rotation of the cylinders materially assists in scavenging the combustion chambers, and the exhaust gases discharged through the manifold pipe will enter the jacket or shield through the apertures in said pipe so that the gases, mixing with the coolant air, become contracted so that the sound of the explosions is more or less muffled. Also, the stationary outer jacket or shield, formed by the semi-cylindrical portion 82 and the inwardly extending side portions 83, provides excellent protection for the engine from atmospheric elements. For convenience in assembly and disassembly, this shield may be made of a plurality of segmental sections that are detachably joined to each other at their proximate ends.

What I claim is:

1. In an internal combustion rotary engine, a stationary shaft, radially disposed cylinders rotatable about said shaft, housing walls spaced from said cylinders and movable therewith, said walls providing an annular peripheral opening between their outer portions, and thermostatically influenced plates extending across said opening and adapted to control the passage of air past said cylinders.

2. In an internal combustion rotary engine, a stationary shaft, radially disposed cylinders rotatable about said shaft, housing walls spaced from said cylinders and movable therewith, said walls providing an annular peripheral opening between their outer portions, a plurality of thermostatic plates extending across and constituting closure means for said opening and adapted to control the passage of air past said cylinders, and a stationary jacket enveloping said housing walls and thermostatic plates and in spaced relation thereto, said jacket having ingress openings in its sides and also having an outlet opening.

3. In an internal combustion rotary engine, a stationary annular jacket, radially disposed cylinders rotatable in said jacket and adapted to create air currents therethrough, and an annular exhaust manifold common to said cylinders and adapted to discharge the exhaust gases of combustion from said cylinders into the air currents in said jacket, whereby said air currents are adapted to cool and contract the exhaust gases and muffle the same.

4. In an internal combustion rotary engine, a stationary shaft, an engine casing rotatable thereon, radially disposed air-cooled cylinders on said casing, laterally spaced plates secured to and movable with said cylinders, said plates providing air inlets and outlets, a stationary annular jacket extending around the outer margins of said plates and inwardly towards the centers thereof in spaced relation thereto, said rotating cylinders constituting blower elements adapted to create air currents within the jacket in intimate relation to said cylinders and in directions radial to said shaft, which said air currents are discharged centrifugally from between said plates, thermostatic means disposed in the path of the air currents, and cooling fins on said cylinders adapted to excessively increase the heat-radiating surfaces thereof, whereby the heat absorbed by said air currents provides means for influencing said thermostatic means to move to opened positions to remove excess heat and to remain in closed positions to conserve the heat, and thereby control the operating temperature of the engine.

5. An internal combustion rotary engine embodying a stationary shaft, an engine casing supported by and rotatable on said shaft, radial cylinders on said engine casing, pistons reciprocable in said cylinders, valve-controlled exhaust ports leading out of the combustion chambers of said cylinders, an annular exhaust manifold common to and communicating with said exhaust ports, said exhaust manifold secured to said cylinders and movable therewith, and means enveloping said cylinders and exhaust manifold into which the latter discharges, whereby the discharged products of combustion are mixed with air currents in said enveloping means prior to discharge into the atmosphere.

6. In an internal combustion rotary engine, a stationary shaft, an engine casing rotatable thereon, radially disposed air-cooled cylinders on said casing, laterally spaced plates secured to and movable with said cylinders, said plates disposed parallel to each other upon opposite sides of said cylinders and provided with an air inlet port, the outer margins of said plates providing an annular air outlet, and an annular jacket extending around the outer margins of said plates and also inwardly towards the centers thereof in spaced relation thereto, said radial cylinders and said laterally spaced plates movable within said jacket to create air currents therein in intimate relation to said cylinders and radial to said shaft.

7. In an internal combustion rotary engine, a stationary shaft, an engine casing rotatable thereon, a plurality of radially disposed cylinders on said engine casing and provided with exhaust ports, laterally spaced plates on opposite sides of and movable with said cylinders, said plates provided with air inlets and their spaced outer portions providing an annular outlet, said cylinders adapted to create air currents between said plates in intimate relation to said cylinders and to discharge said air currents centrifugally through said annular outlet, thermostatic means disposed in the discharge path of the air currents and influenced by the temperature of said currents to control said annular outlet, and an annular manifold tube communicating with the exhaust ports of said cylinders and adapted to discharge the scavenged products of combustion into and to intermingle said products of combustion with said air currents.

8. In an internal combustion rotary engine, a stationary shaft, an engine casing rotatable thereon, a plurality of radially disposed cylinders on said engine casing and provided with exhaust ports, laterally spaced plates on opposite sides of and movable with said cylinders, said plates provided with air inlets and their spaced outer portions providing an annular outlet, said cylinders adapted to create air currents between said plates and discharge the same through said opening, thermostatic devices disposed in the discharge path of said air and influenced by the temperature of said currents to control said annular outlet, an annular manifold tube communicating with the exhaust ports of said cylinders and adapted to discharge the products of combustion into said air currents, and a stationary enveloping jacket surrounding said cylinders and spaced plates, said jacket adapted to receive said air currents and the discharged products of combustion and intermingle the same.

9. In an internal combustion rotary engine, a stationary shaft, an engine casing rotatable thereon, radial cylinders on said casing, valve-controlled exhaust ports discharging the products of combustion out of said cylinders, and a continuous annular exhaust manifold in communication with said exhaust ports.

10. In an internal combustion rotary engine, a stationary shaft, an engine casing rotatable thereon, radial cylinders on said casing, valve-controlled exhaust ports discharging the products of combustion out of said cylinders, a continuous annular exhaust manifold communicating with said exhaust ports, and an annular jacket extending about said cylinders and said manifold adapted to receive the products of combustion from said manifold.

11. In an internal combustion rotary engine, cylinders disposed radially with respect to and bodily movable about a common axis, a stationary jacket extending along the sides and across the heads of said cylinders, whereby rotational movement of said cylinders is adapted to create air currents in said jacket, and an exhaust manifold common to said cylinders and supported thereby for receiving the products of combustion from said cylinders, said manifold provided with a plurality of apertures adapted to discharge said products of combustion radially into the air currents in said jacket and intermingle the same.

12. In an internal combustion rotary engine, a stationary shaft, radially disposed cylinders rotatable about said shaft and spaced from each other annularly to said shaft, stationary means enveloping said cylinders and wherein the movement of said cylinders is adapted to create air currents, said enveloping means provided with ingress and egress openings, and baffling means interposed between said cylinders for constricting the spaces intermediates the successive cylinders.

13. In an internal combustion rotary engine, a stationary shaft, radially disposed rotatable cylinders spaced from each other annularly about said shaft, stationary means enveloping said cylinders wherein the movement of said cylinders is adapted to create air currents, said enveloping means provided with ingress and egress openings, and hollow box-shaped baffles interposed between said cylinders and constricting the spaces between successive cylinders.

14. In an internal combustion rotary engine, a stationary shaft, radially disposed rotatable cylinders spaced from each other annularly about said shaft, a stationary shell enveloping said cylinders wherein the movement of said cylinders is adapted to create air currents, said shell provided with ingress and egress openings, annular housing walls movable with said cylinders and disposed in parallel relation to and alongside said cylinders, and transverse baffling means connecting said annular walls between successive cylinders whereby to constrict the spaces between said cylinders.

15. In an internal combustion rotary engine, radial cylinders rotatable about a common axis, a stationary housing enveloping the sides and heads of said cylinders and wherein the movement of said cylinders is adapted to create circulating air currents, pistons reciprocable in said cylinders, and exhaust ports in the heads of said cylinders discharging the products of combustion radially into said stationary housing, whereby the rotation of said cylinders is adapted to create centrifugal force to assist in exhausting the products of combustion into said housing and thereby minimize back-pressure on said pistons.

16. In an internal combustion rotary engine, a stationary shaft, radial cylinders rotatable about said shaft, a stationary annular housing enveloping said cylinders and wherein the movement of said cylinders is adapted to create circulating air currents, an annular exhaust manifold within said housing, pistons reciprocable in said cylinders, and exhaust ports in said cylinders discharging the products of combustion into said annular manifold, whereby the rotation of said cylinders is adapted to create centrifugal force to assist in exhausting the products of combustion from said cylinders and thereby minimize back-pressure on said pistons.

17. In an internal combustion rotary engine, a plurality of radial cylinders rotatable about a common axis, housing walls alongside said cylinders, the outer portions of said walls spaced from each other to provide a cylindrical opening, and closures for said cylindrical opening, said closures themselves being formed of thermostatic elements and constituting the sole means for operating said closures.

18. In an internal combustion rotary engine, a plurality of radial cylinders rotatable about a common axis, housing walls alongside said cylinders, the outer portions of said walls spaced from each other to provide a cylindrical opening, thermostatic elements constituting closure means for said opening and controlling the movement of air past said cylinders, and an outer jacket enveloping said housing walls and said thermostatic elements, into which jacket the air passing out of said cylindrical opening is discharged.

19. In an internal combustion rotary engine, a plurality of radial cylinders rotatable about a common axis, housing walls alongside said cylinders, the outer portions of said walls spaced from each other to provide a cylindrical opening, and closure means for said cylindrical opening embodying a plurality of bi-metal plates having different co-efficients of expansion and adapted to control the movement of air past said cylinders.

20. In an internal combustion rotary engine, radially disposed cylinders rotatable about a common axis, housing walls spaced from said cylinders and movable therewith, there being an open space between the outer peripheral portions of said housing walls, and self-contained thermostatic elements constituting closures extending across said open space and adapted to control the passage of air therethrough.

21. In an internal combustion rotary engine, a plurality of cylinders rotatable about a common axis, spaced parallel plates between which said cylinders are disposed, said plates being laterally spaced from said cylinders and providing an open-ended space for circulation of air about said cylinders, and closures extending across said open end and spaced beyond the outer ends of said cylinders, said closures themselves being formed of thermostatic elements and constituting the sole means for operating the closures.

22. In an internal combustion rotary engine, a plurality of cylinders rotatable about a common axis, spaced parallel plates between which said cylinders are disposed, said plates being laterally spaced from said cylinders and providing an open-ended space for circulation of air about said cylinders, closures extending across said open end and spaced beyond the outer ends of said cylinders, said closures themselves being formed of thermostatic elements and constituting the sole means for operating the closures, and means supporting said closures independently of said plates.

23. In an internal combustion rotary engine, a plurality of cylinders rotatable about a common axis, spaced parallel plates between which said cylinders are disposed, said plates being laterally spaced from said cylinders and providing an open-ended space for circulation of air about said cylinders, said plates being provided with openings adjacent the inner ends of said cylinders for admission of air into said space, and closures extending across said open end and spaced beyond the outer ends of said cylinders, said closures themselves being formed of thermostatic elements and constituting the sole means for operating said closures.

24. An internal combustion engine embodying a cylinder, a housing within which said cylinder is disposed, said housing being spaced from and fixed with respect to said cylinder and provided with an air inlet and an air outlet, a thermostatically influenced element constituting a closure for said outlet, a jacket within which said housing and cylinder are rotatable, said jacket having an air inlet and a discharge outlet, and an exhaust outlet from said cylinder discharging into said jacket, said cylinder and said housing being rotatable about a common axis, said element being controlled in its thermostatic operation by the action of the air currents thereupon, and said air currents in turn being controlled by said element.

25. An internal combustion engine embodying a plurality of radially disposed cylinders, a housing within which said cylinders are disposed, said housing having an air inlet and an air outlet, a plurality of thermostatic elements separate from each other and forming closures for said outlet, and means whereby circulating air currents may be caused to flow through said housing, said air currents controlling the operation of the said elements by action directly thereupon, and said elements in turn controlling the flow of said air currents past said cylinders, said thermostatic elements operating in opposition to each other.

26. An internal combustion engine embodying a plurality of radially arranged cylinders, a housing within which said cylinders are disposed, said housing having an air inlet and an air outlet, a thermostatic element forming a closure for said outlet, an outer jacket within which said housing and said thermostatic element are enclosed, said jacket receiving air from said outlet opening, and itself being provided with an outlet, and means whereby circulating air currents may be caused to flow through said housing, across said cylinders and into said jacket, said thermostatic element controlling the flow of said air currents, and said air currents in turn controlling the operation of said element by directly acting thereupon.

27. An internal combustion engine embodying a plurality of radially arranged laterally spaced cylinders, a housing within which said cylinders are disposed, said housing being spaced from and fixed with respect to said cylinders and provided with an air inlet and an air outlet, thermostatically influenced elements separate from each other and constituting closures for said outlet, a jacket within which said housing and cylinders are rotatable, said jacket having an air inlet and a discharge outlet, and an exhaust from said cylinders discharging into said jacket, said cylinders and said housing being rotatable about a common axis, said elements being controlled in their thermostatic operation by the action of the air currents directly thereupon, and said air currents in turn being controlled by said elements, said thermostatic elements operating in opposition to each other.

28. An internal combustion engine embodying a plurality of radially arranged cylinders laterally spaced from each other, a housing within which said cylinders are disposed, said housing being spaced from and fixed with respect to said cylinders and provided with an air inlet and an air outlet, thermostatically influenced elements separate from each other and constituting closures for said outlet, a jacket within which said housing and said cylinders are rotatable, said jacket having an air inlet and a discharge outlet, an exhaust from said cylinders discharging into said jacket, said cylinders and said housing being rotatable about a common axis, said elements being controlled in their thermostatic operation by the action of the air currents directly thereupon and said air currents in turn being controlled by said elements, and baffles disposed between adjacent cylinders, said baffle operating to constrict the spaces between the cylinders.

29. An internal combustion engine embodying a cylinder, a housing within which said cylinder is disposed, said housing being spaced from and fixed with respect to said cylinder and provided with a path for coolant air, a thermostatically influenced element constituting a variable impediment to said coolant air, a stationary jacket within which said housing and cylinder are rotatable, said jacket having an air inlet and a discharge outlet, and an exhaust outlet from said cylinder discharging into the jacket, said cylinder and said housing being rotatable about a common axis, said element being controlled in its thermostatic operation by the action of the air currents thereupon and said air currents in turn being controlled by said element.

30. An internal combustion engine embodying a plurality of radially disposed cylinders, a housing within which said cylinders are disposed, said housing having a path for coolant air, a plurality of thermostatic elements constituting variable impediments to the coolant air currents, and means whereby said air currents may be created, said air currents controlling the operation of the said elements by action directly thereupon, and said elements in turn controlling the flow of said coolant air past said cylinders, said thermostatic elements operating alternately with respect to each other.

31. An internal combustion engine embodying a plurality of radially arranged cylinders, a housing within which said cylinders are disposed, said housing having a path for coolant air, a thermostatically influenced element constituting a variable impediment to said coolant air, an outer jacket within which said housing and said thermostatic element are enclosed, said housing discharging into said jacket and said jacket having an outlet, and means whereby currents of said coolant air may be caused to flow through said housing, across said cylinders and into said jacket, said thermostatic element controlling the flow of said air currents, and said air currents in turn controlling the operation of said element by directly acting thereupon.

32. An internal combustion engine embodying a plurality of radially arranged laterally spaced rotatable cylinders, a housing within which said cylinders are disposed, said housing rotating with said cylinders and having a path for coolant air therethrough, thermostatically influenced elements separate from each other and constituting variable impediments to said coolant air, a jacket within which said housing and said cylinders are rotatable, said jacket having a discharge outlet, said cylinders exhausting into said jacket, said elements being controlled in their thermostatic operation by the action of the air currents directly thereupon, and said air currents in turn being controlled by said elements, said thermostatic elements operating alternately with respect to each other.

LESLIE W. BEAVEN.